United States Patent

Lu et al.

[11] Patent Number: 6,046,560
[45] Date of Patent: Apr. 4, 2000

[54] ELECTRIC ASSIST STEERING SYSTEM HAVING AN IMPROVED MOTOR CURRENT CONTROLLER WITH GAIN SCHEDULER

[75] Inventors: Engelbert Lu, Ann Arbor; Kevin M. McLaughlin, Troy, both of Mich.

[73] Assignee: TRW Inc., Lyndhurst, Ohio

[21] Appl. No.: 09/045,555

[22] Filed: Mar. 20, 1998

[51] Int. Cl.[7] .................................................. H02P 7/00
[52] U.S. Cl. .................. 318/432; 318/701; 318/473; 318/610; 318/254; 388/906; 180/443; 180/446
[58] Field of Search ............................... 318/432–434, 318/280–286, 446, 452–454, 461, 465, 701, 254, 471–473, 606–610; 388/906, 809–815; 180/443–446

[56] References Cited

U.S. PATENT DOCUMENTS

| | | |
|---|---|---|
| Re. 32,222 | 8/1986 | Drutchas . |
| 4,096,422 | 6/1978 | Fleming et al. . |
| 4,300,081 | 11/1981 | Van Landingham . |
| 4,415,054 | 11/1983 | Drutchas . |
| 4,636,700 | 1/1987 | Moore et al. . |
| 4,719,561 | 1/1988 | Shigemasa ........................... 364/148 |
| 4,768,143 | 8/1988 | Lane et al. ........................... 364/157 |
| 4,825,132 | 4/1989 | Gritter . |
| 4,922,412 | 5/1990 | Lane et al. ........................... 364/157 |
| 5,034,668 | 7/1991 | Bausch . |
| 5,216,345 | 6/1993 | Eyerly . |
| 5,223,775 | 6/1993 | Mongeau . |
| 5,257,828 | 11/1993 | Miller et al. . |
| 5,404,418 | 4/1995 | Nagano . |
| 5,475,289 | 12/1995 | McLaughlin et al. . |
| 5,504,403 | 4/1996 | McLaughlin . |
| 5,568,389 | 10/1996 | McLaughlin et al. . |
| 5,625,239 | 4/1997 | Persson et al. . |
| 5,704,446 | 1/1998 | Chandy et al. ........................ 180/446 |
| 5,712,539 | 1/1998 | Zweighaft et al. . |

*Primary Examiner*—David Martin
*Attorney, Agent, or Firm*—Tarolli, Sundheim, Covell, Tummino & Szabo L.L.P.

[57] ABSTRACT

A motor controller controls the operation of an electric motor (28). The motor controller includes sensors (30, 97, 102) for sensing at least one dynamic operating characteristic of the motor and for providing a signal indicative of the at least one sensed dynamic motor operating characteristic. A variable gain regulator (190) receives a current command request signal having a value and provides a motor current control signal having a value functionally related to the value of the received current command request signal and a gain control value. A gain scheduler (196) is operatively coupled to the variable gain regulator (190) and to the sensor (30, 97, 102) for providing the gain control value to the variable gain regulator (196) in response to the sensed at least one dynamic motor operating characteristic to thereby control the amount of gain of the variable gain regulator (190). The motor controller further includes a drive circuit (204, 120) operatively connected to the variable gain regulator (190) and the motor (28) for energizing the motor in response to the motor current control signal.

33 Claims, 10 Drawing Sheets

Microfiche Appendix Included
(1 Microfiche, 18 Pages)

ABSTRACT

ELECTRIC ASSIST STEERING SYSTEM HAVING AN IMPROVED MOTOR CURRENT CONTROLLER WITH GAIN SCHEDULER

This patent includes a Microfiche Appendix that includes eighteen frames on a single sheet of microfiche.

TECHNICAL FIELD

The present invention is directed to an electric assist steering system and is particularly directed an electric assist steering system having an improved motor current controller that provides a controllable bandwidth consistent to control objectives such as constant bandwidth substantially independent of motor operating conditions, reduced motor acoustic noise, increased torque output at speeds, and reduced torque ripple.

BACKGROUND OF THE INVENTION

Electric assist steering systems are well known in the art. Electric power assist steering systems that utilize a rack and pinion gear set provide power assist by using an electric motor to either (i) apply rotary force to a steering shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

U.S. Pat. No. 4,415,054 to Drutchas (now U.S. Reissue Pat. No. 32,222,), assigned to TRW Inc., utilizes a D.C. electric assist motor driven through an "H-bridge" arrangement. The assist motor includes a rotor encircling a steering member. The steering member has a first portion with a thread convolution and a second portion with straight cut rack teeth. Rotation of the electric assist motor rotor causes linear movement of the steering member through a ball-nut drivably connected to the thread convolution portion of the steering member. A torque sensing device is coupled to the steering wheel for sensing driver applied torque to the steering wheel. The torque sensing device uses a magnetic Hall-effect sensor that senses relative rotation between the input and output steering shafts across a torsion bar. An electronic control unit ("ECU") monitors the signal from the torque sensing device. A vehicle speed sensor provides a signal to the ECU indicative of the vehicle speed. The ECU controls current through the electric assist motor and, in turn, steering assist in response to both the sensed vehicle speed and the sensed applied steering torque. The ECU decreases steering assist as vehicle speed increases. This is commonly referred to in the art as speed proportional steering.

U.S. Pat. No. 5,257,828 to Miller et al., and assigned to TRW Inc., discloses an electric assist steering system having yaw rate control. This system uses a variable reluctance ("VR") motor to apply steering assist to the rack member. The torque demand signal is modified as a function of a steering rate feedback signal so as to provide damping.

U.S. Pat. No. 5,504,403 to McLaughlin, and assigned to TRW Inc., discloses a method and apparatus for controlling an electric assist steering system using an adaptive blending torque filter. The adaptive blending torque filter processes the applied steering torque signal and maintains a selectable system bandwidth during system operation. This arrangement provides a steering system having a bandwidth that is substantially independent of vehicle speed and applied steering torque.

Ideally, the electric motor of an electric assist steering system will have a bandwidth much greater than that of the electric steering system so that the response of the electric motor does not negatively impact the stability of the steering system. A variable reluctance motor is such a high bandwidth motor. A constant bandwidth motor is desirable so as to achieve control not only over the low frequency steering operation, but also over the higher frequency acoustic noise so that the motor is quiet. However, the uncontrolled bandwidth of a VR motor varies and is a function of the motor current i, the rotor position θ relative to the stator, the motor resistance, and motor temperature t. It is desirable to maintain a consistent system bandwidth independent of such motor operating conditions. The controller must compensate for this varying bandwidth to achieve a constant bandwidth. VR motors have acoustically sensitive structural modes in which the motor's stator housing ("shell") experience movement in a radial direction, and at particular drive frequencies, the motor shell will resonate. Unfortunately, this resonance can occur in the human audible range. The motor will, in effect, act as a "speaker" producing an undesirable motor buzz. The motor can further exhibit a "microphone" effect as a result of shell acceleration resulting in current oscillations in the motor coils inducing further noise out of the motor. It is, therefore, desirable to reduce such acoustic noise and, in turn, torque ripple.

SUMMARY OF THE INVENTION

In accordance with the present invention, a motor controller is provided having a variable gain. The gain is controlled as a function of the motor's rotor position and motor current. The gain is controlled so as to provide a consistent current bandwidth substantially independent of rotor position and motor current. A filter is provided in a control loop to filter from a current command signal frequencies that could result in motor shell resonance. The system, in accordance with the present invention provides (i) consistent operating bandwidth, (ii) reduced acoustic noise, (iii) a fast response time, (iv) reduced torque ripple, and (v) increased torque output at speeds.

In accordance with one aspect of the present invention, a motor controller is provided for controlling the operation of an electric motor. The motor controller comprises sensing means for sensing at least one dynamic operating characteristic of the motor and for providing a signal indicative of the at least one sensed dynamic motor operating characteristic. A variable gain regulator receives a current command request signal having a value and provides a motor current control signal having a value functionally related to the value of the received current command request signal and a gain control value. A gain scheduler is operatively coupled to the variable gain regulator and to the sensing means for providing the gain control value to the variable gain regulator in response to the sensed at least one dynamic motor operating characteristic to thereby control the amount of gain of the variable gain regulator. The motor controller further includes a drive circuit operatively connected to the variable gain regulator and the motor for energizing the motor in response to the motor current control signal.

In accordance with another aspect of the present invention, an electric assist steering system is provided comprising, a torque sensor for sensing applied steering torque and providing a signal having a value indicative of the applied steering torque. An electric assist motor is driving connected to a steering member so that when the electric assist motor is energized, it provides steering assist. The system further includes a motor controller for providing a current command signal having a value functionally related to the sensed applied steering torque, and sensor means for sensing at least one dynamic operating characteristic of the motor and for providing a signal indicative of the at least one sensed dynamic motor operating characteristic. A variable gain regulator receives the current command request signal having a value and provides a motor current control signal having a value functionally related to the value of the received current command request signal and a gain control value. The system further includes a gain scheduler operatively coupled to the variable gain regulator and to the sensing means for providing the gain control value to the variable gain regulator in response to the sensed at least one dynamic motor operating characteristic to thereby control the amount of gain of the variable gain regulator. A drive circuit is operatively connected to the variable gain regulator and the motor for energizing the motor in response to the motor current control signal.

In accordance with yet another aspect of the present invention, a method is provided for controlling the operation of an electric motor, said method comprising the steps of sensing at least one dynamic operating characteristic of the motor and providing a signal indicative of the at least one sensed dynamic motor operating characteristic, and providing a variable gain regulator for receiving a current command request signal having a value and for providing a motor current control signal having a value functionally related to the value of the received current command request signal and a gain control value. The method further includes the steps of providing the gain control value to the variable gain regulator in response to the sensed at least one dynamic motor operating characteristic to thereby control the amount of gain of the variable gain regulator, and energizing the motor in response to the motor current control signal.

BRIEF DESCRIPTION OF THE DRAWINGS

Other features and advantages of the present invention will become apparent to those skilled in the art to which the present invention relates from a reading of the following detailed description with reference to the accompanying drawings, in which:

FIG. 4 is a schematic circuit diagram of a portion of the drive circuit and power switches shown in FIG. 1;

DESCRIPTION OF PREFERRED EMBODIMENT

Figure 1:
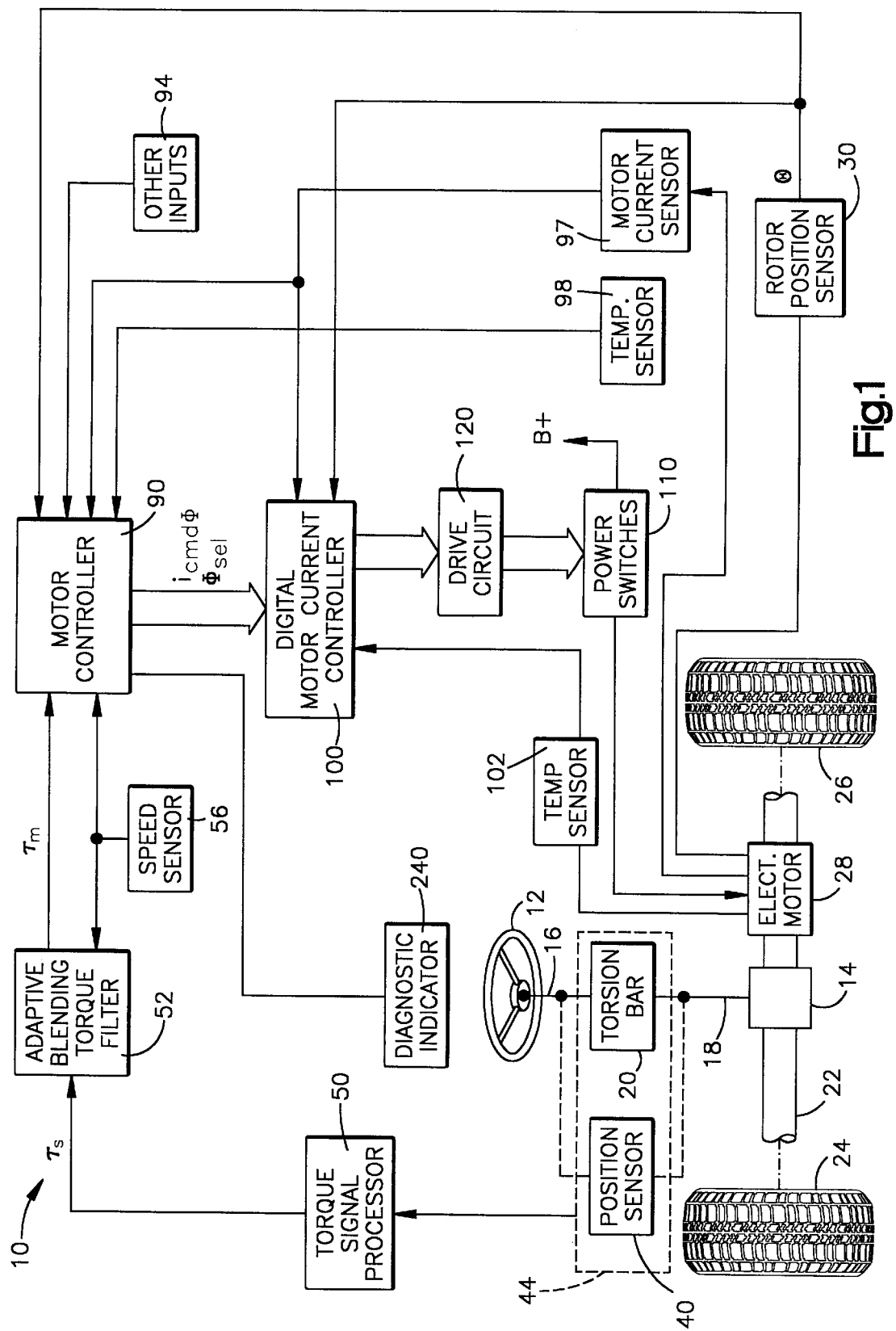
FIG. 1 is a schematic block diagram illustrating a power assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 18. The input shaft 16 is operatively coupled to the output shaft 18 through a torsion bar 20.

The torsion bar 20 twists in response to applied steering torque thereby permitting relative rotation between the input shaft 16 and the output shaft 18. Stops, not shown, limit the amount of such relative rotation between the input and output shafts in a manner known in the art. The torsion bar 20 has a spring constant referred to herein as $K_r$. In accordance with a preferred embodiment, the spring constant $K_r$=20 in-lb/deg. The amount of relative rotation between the input shaft 16 and the output shaft 18 in response to applied steering torque is functionally related to the spring constant of the torsion bar.

As is well known in the art, the pinion gear 14 has helical teeth, not shown, which are meshingly engaged with straight cut teeth, not shown, on a rack or linear steering member 22. The pinion gear 14 in combination with the straight cut gear teeth on the rack member 22 form a rack and pinion gear set. The rack is steerably coupled to the vehicle's steerable wheels 24, 26 with steering linkage in a known manner. When the steering wheel 12 is turned, the rack and pinion gear set converts the rotary motion of the steering wheel 12 into linear motion of the rack 22. When the rack moves linearly, the steerable wheels 24, 26 pivot about their associated steering axes and the vehicle is steered.

An electric assist motor 28 is drivingly connected to the rack 22 through a ball-nut, drive arrangement. When the electric motor 28 is energized, it provides power assist steering by aiding in the linear drive of the rack so as to aid in the rotation of the vehicle steering wheel 12 by the vehicle operator.

In accordance with a preferred embodiment of the present invention, the electric assist motor 28 is a variable reluctance ("VR") motor. A VR motor is desirable for use in an electric assist steering system because of its small size, low friction, and its high torque-to-inertia ratio. The VR motor 28, in accordance with a preferred embodiment of the present invention, is a four phase motor having eight stator poles and six rotor poles. The stator poles are arranged so as to be energized in pairs thereby forming the four phases of the motor.

The principles of operation of a VR motor are well known in the art and, therefore, are not described herein in detail. Basically, the stator poles are energized in pairs. The rotor moves so as to minimize the magnetic reluctance between the energized stator poles and the closest pair of rotor poles. Minimum reluctance occurs when a pair of rotor poles is aligned with the energized stator poles. Once minimum reluctance is achieved, i.e., when the rotor poles align with the energized stator poles, those energized stator coils are de-energized and, assuming further motor movement is desired, an adjacent pair of stator coils (depending on the desired motor direction) are energized.

In many DC motors, controlling the direction of current flow through the motor windings controls direction of motor rotation. In a VR motor, current is passed through the stator coils in only one direction independent of the desired direction of motor operation. The direction of motor rotation is controlled by the sequence in which the stator coils are energized. For example, for the motor to move in one direction, phase Aa is energized followed by Bb. If it is desirable to move the motor in the opposite direction, the energization of phase Aa would be followed by the energization of phase Dd.

Controlling the current through the stator coils controls the torque produced by the motor. When the assist steering motor is energized, the rotor turns which, in turn, rotates the nut portion of the ball-nut drive arrangement. When the nut rotates, the balls transfer a linear force to the rack. The direction of rack movement and, in turn, the direction of steering movement of the steerable vehicle wheels, is dependent upon the direction of rotation of the motor.

A motor rotor position sensor 30 is operatively connected to the motor rotor and to the motor housing. The function of the rotor position sensor 30 is to provide an electric signal indicative of the position of the motor rotor relative to the motor stator. As is well known in the art, operation of a VR motor requires this position information. While any known rotor position sensor may be used with the present invention, a rotor position sensor of the type disclosed in U.S. Pat. No. 5,625,239 to Persson et al., and assigned to TRW Inc., is preferred.

A steering shaft position sensor 40 is operatively connected across the steering input shaft 16 and the steering output shaft 18 and provides an electric signal having a value indicative of the relative rotational position or relative angular orientation between the input shaft 16 and the output shaft 18. The position sensor 40 in combination with the torsion bar 20 form a torque sensor 44 that provides and electric signal having a value indicative of the applied steering torque. The steering wheel 12 is rotated by the driver during a steering maneuver through an angle $\theta_{HW}$. The relative angle between the input shaft 16 and the output shaft 18 as a result of applied input torque is referred to herein as $\theta_p$. Taking the spring constant $K_t$ of the torsion bar 20 into account, the electric signal from the sensor 40 is also indicative of the applied steering torque referred to herein as $\tau_s$.

The output of the torque sensor 44 is connected to a torque signal processing circuit 50. The processing circuit 50 monitors the applied steering torque angle $\theta_p$ and, "knowing" the spring constant $K_t$ of the torsion bar 20, provides an electric signal indicative of the applied steering torque $\tau_s$.

The torque sensor signal is passed through a filtering circuit 52. Preferably, the filter 52 is an adaptive blending torque filter of the type disclosed in U.S. Pat. No. 5,504,403 to McLaughlin, and assigned to TRW Inc. The adaptive blending torque filter 52 receives a vehicle speed signal from a vehicle speed sensor 56. The adaptive blending torque filter 52 is adapted to have a non-linear characteristic at torque frequencies less than a blending frequency and a linear characteristic at torque frequencies greater than the blending frequency. The blending filter 52 establishes the blending frequency at a value functionally related to the vehicle speed. It is contemplated that other torque signal filter arrangements may be used with the present invention. The purpose of the adaptive blending torque filter is to maintain a selectable system bandwidth during system operation and thereby, prevent steering sluggishness as vehicle speed increases.

Figure 2:
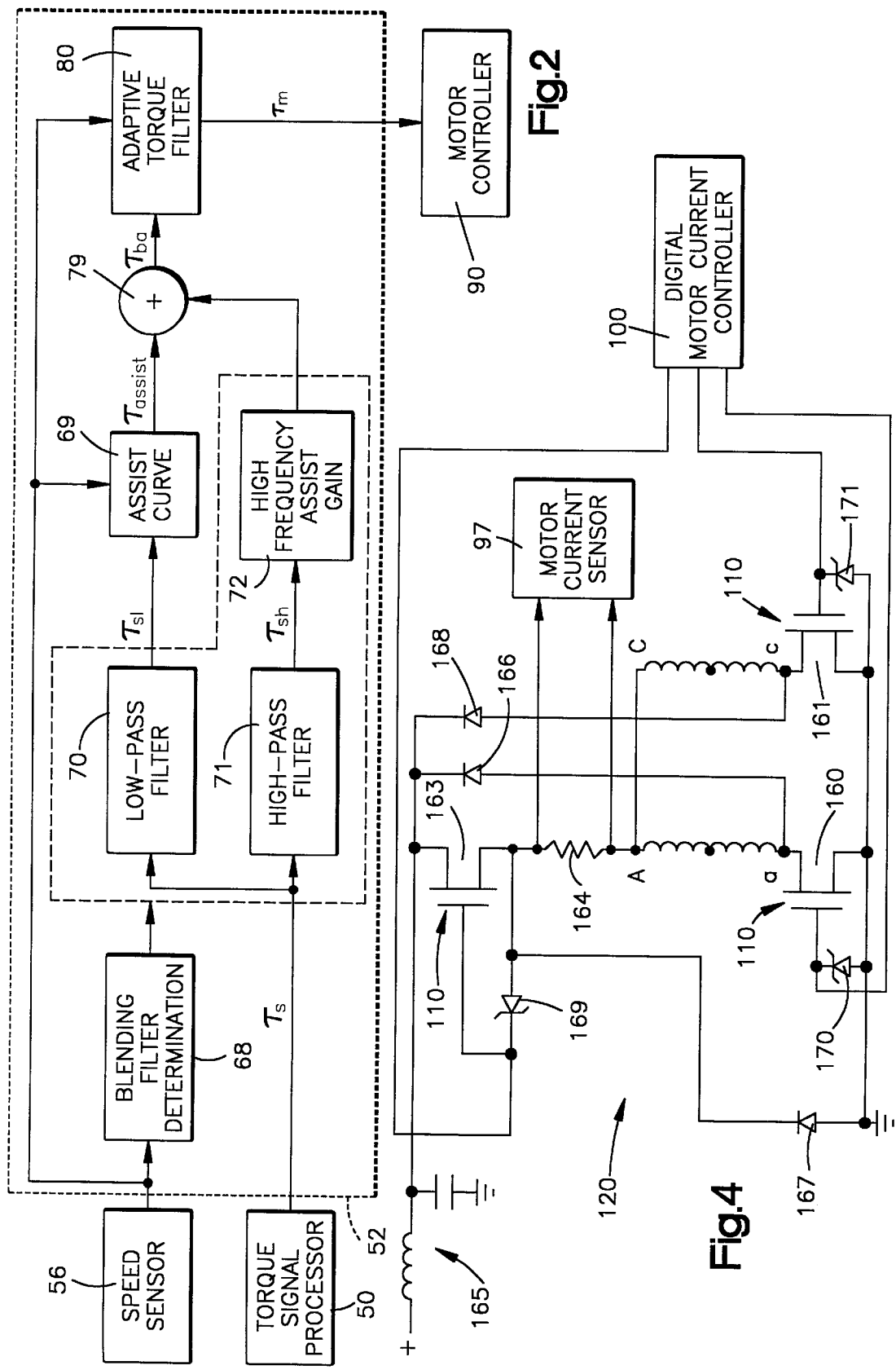
FIG. 2 is a schematic block diagram of a portion of the system of FIG. 1 showing the adaptive blending torque filter in greater detail.

Referring to FIG. 2, the blending filter 52 includes both a low pass filter 70 and a high pass filter 71, both connected to the output of the torque signal processor 50. The filters 70, 71 are designed such that summation of the two filters is identically one for all frequencies. The low pass filter 70 allows all of the signal $\tau_s$ with frequency $\tau_{sl}$ content below a predetermined blending frequency $w_b$ to pass through while rejecting all high frequency data. The high pass filter 71 allows all of the signal $\tau_s$ with frequency $\tau_{sh}$ content above some blending frequency $w_b$ to pass through while rejecting all low frequency data. The value of the blending filter frequency $w_b$ is a function of vehicle speed and is determined by the blending filter determination circuit 68 connected to the output of the speed sensor 56. The determination of $W_b$ may be accomplished using a look-up table in a microcomputer having predetermine stored values or by calculation in accordance with a desired control function.

The low pass torque sensor output is connected to an assist curve circuit 69, which is preferably a look-up table. The vehicle speed sensor 56 is also operatively connected to the assist curve circuit. As is well known in the art, the amount of power assist desired for a vehicle steering system decreases as vehicle speed increases. Therefore, to maintain a proper or desirable feel for steering maneuvers, it is desirable to decrease the amount of steering power assist as the vehicle speed increases. This is referred to in the art as speed proportional steering.

The assist torque $\tau_{assist}$ values are determined from stored values in a look-up table representing a plurality of assist curves of torque-in values verses torque-out values. Since torque assist varies as a function of vehicle speed, these curves range from values required during dry surface parking to those needed at high vehicle speeds. Generally, the value of the output from the assist curve circuit 69 is referred to as $\tau_{assist}$. The actual values for control are determined from interpolation of the predetermined values stored in the look-up table if needed. Preferably, dual assist curves with interpolation are used as described in U.S. Pat. No. 5,568,389 to McLaughlin et al. and assigned to TRW Inc.

The high passed torque sensor signal $\tau_{sh}$ from a high pass filter is multiplied 72 by a predetermined gain value $S_{c1}$ that is a function of the vehicle speed. The determination of $S_{c1}$ may be accomplished using a look-up table in a microcomputer or may be accomplished using an actual calculation in accordance with a desired control function. Modification of the high frequency assist gain value $S_{c1}$ allows the bandwidth of the steering system to be modified.

The assist curve value assist output from 69 and the determined high frequency assist gain value from 72 are summed in a summing function 79. This summed value output of the summing circuit 79 is referred to as $\tau_{ba}$ and is connected to an adaptive torque filter circuit 80.

The adaptive torque filter circuit 80 filters the input blended assist torque signal $\tau_{ba}$. The filter is adaptive in that its poles and zeros are allowed to change as the vehicle speed changes so as to provide an optimal control system. This filtering and results in a filtered torque signal $\tau_m$ is referred to herein as the torque demand signal. The torque demand signal $\tau_m$ is connected to a motor controller 90.

The blending filter determination circuit 68 and adaptive filter 80 are fully described in the above mentioned McLaughlin '403 patent. Basically, a linearized closed loop control system is considered for the design of the blending filter and adaptive filter for the steering system 10. Rotation of the hand wheel 12 results in an angular displacement of $\theta_{HW}$ on the steering wheel side of the torsion bar position sensor 40. This angular displacement is differenced with the resultant angular displacement of the output shaft 18 after it is driven in rotation by the electric assist motor by an angle $\theta_m$ through the gearing ratio represented by $r_m/r_p$ where $r_m$ is the effective radius of the motor ball nut and $r_p$ is the effective radius of the pinion. One radian of rotation of the ball nut produces $r_m$ inches of travel of the rack. Similarly, one radian of rotation of the pinion produces $r_p$ inches of travel of the rack. The resultant angular displacement $\theta_p$ times the spring constant $K_t$ gives the torque signal $\tau_s$. In the closed loop arrangement, the output $\tau_s$ is connected to the low pass/high pass filter circuits.

The torque signal $\tau_s$ is passed through the low pass filter 70 resulting in the low passed assist torque $\tau_{sl}$. The high passed assist torque $\tau_{sh}$ is determined by subtracting the low frequency assist torque from the torque signal $\tau_s$. The reason that %sh can be determined in this way is discussed below.

Continuous domain blending filters are chosen such that the sum of the low pass filter $G_l(S)$ and the high pass filter $G_H(S)$ is always equal to one. The low pass filter is chosen to be a first order filter with a pole at $\omega_b$. The high pass filter is defined by the constraint that the sum of the two filters must be one. Therefore, the low and high pass filters can be represented as:

$$G_l(S) = \frac{\omega_b}{S + \omega_b}$$

$$G_H(S) = S/(S + \omega_b)$$

When realizing a set of blending filters in a digital computer, those skilled in the art will appreciate that it is not necessary to construct separate high and low pass filter stages. Rather, the input to the blending filters $\tau_s$ is passed through the low pass filter resulting in the signal $\tau_{sl}$. The high passed signal is the original input torque minus the low passed portion. This can be thought of equivalently as determining the low frequency portion of the signal and simply subtracting it out of the original signal. The result is a signal with only high frequency information. Alternatively, one can use higher order blending filters. However, the complexity of the filter computations increases with filter order in a digital computer. The use of first order filters is preferred.

Referring back to FIG. 1, the output $\tau_m$ of the adaptive blending torque filter 52 is connected to a motor controller 90. The rotor position sensor 30 is connected to the motor controller 90 as is the vehicle speed sensor 56. The motor controller 90, which controls the assist motor 28, also controls steering damping in response to sensed rotor speed. Although motor damping may be controlled in any desired manner (if at all), a preferred damping arrangement is described in U.S. Pat. No. 5,257,828 to Miller et al, and assigned to TRW Inc.

A control system temperature sensor 98, and other inputs 94 are also connected to the motor controller 90. Such other inputs 94 may include any desired sensor such as yaw rate sensor, acceleration sensor, engine RPM sensor, etc. Such other inputs would be connected to the motor controller so as to provide motor control in responsive to such other sensed parameters.

It is contemplated that the control circuitry making up the adaptive blending torque filter 52, motor controller 90, and other circuitry described below, would be manufactured in an application specific integrated circuit ("ASIC"). The temperature sensor 98 would monitor the temperature of the ASIC. The control unit temperature sensor 98 provides a signal to the controller 90 indicative of the temperature of the overall system control circuitry. The controller 90 would adapt control of the motor in response to the sensed temperature. For example, a too high of temperature of the ASIC could warrant reducing the amount of assist provided.

The motor controller 90 provides a motor current demand signal $i_{cmd\phi}$ and a phase select signal $\phi_{SEL}$ in response to the torque demand signal $\tau_m$, the present rotor position $\theta$ as sensed by the rotor position sensor 30, the direction of the torque demand, the sensed vehicle speed as sensed by the speed sensor 56, the sensed motor current as sensed by the motor current sensor 97, and the temperature of the control system as sensed by the temperature sensor 98. The controller 90 may include other desired control features such as system soft start, etc. These features are known in the art and are, therefore, not described herein.

The motor controller 90 provides the current demand signal in accordance with any known steering control algorithm. The current command values as functions of measured parameters are preferably stored in a look-up table in which values are selected in accordance with the measured parameters. Since a look-up table can only store a discrete number of values, final current command values would be determined using an interpolation technique. Such interpolation is disclosed in U.S. Pat. No. 5,475,289 to McLaughlin et al. and assigned to TRW Inc. The desired amount of steering assist as a function of applied steering torque, vehicle speed, etc., (i.e., the current command values in the look-up table) may be specified by the vehicle manufacturer. Such values may also be selected in response to computer modeling or through empirical methods.

The controller 90 outputs the current command signal $i_{cmd\phi}$ and the phase select signal $\phi_{sel}$ to a digital motor current controller 100 ("DMCC"). Since the motor 28 is a four-phase VR motor (in accordance with a preferred embodiment) the phase to be energized is selected in response to the motor position and the direction of the applied steering torque.

A motor temperature sensor 102 is operative coupled to the motor 28 and provides the DMCC 100 a signal indicative of the temperature of the motor 28. The output from the rotor position sensor 30 is also connected to the DMCC 100 as is the output of the motor current sensor 97.

The output of the DMCC 100 controls the current provided to each motor phase through a drive circuit 120 which is controllably connected to a plurality of power switches 110. The power switches 110 are operatively connected between the vehicle battery B+ and the stator coils of the motor 28. As mentioned above, control of a variable reluctance motor requires that the relative position between the rotor and the stator be known.

Referring to FIG. 4, a portion of the drive circuit 120 and a portion of the power switches 110 are shown for the stator coils Aa and Cc, i.e., for two of the four phases of the preferred four phase motor. As mentioned, the eight stator poles make up the four motor phase windings designated Aa, Bb, Cc, and Dd. If the motor is moving continuously in one direction and assuming motor rotor position identifies phase Aa is the first phase to be energized, the energization of the phases would be Aa, AaBb, Bb, BbCc, Cc, CcDd, Dd, DdAa, Aa, etc. In the other direction, the energization of the phases would be Aa, AaDd, Dd, DdCc, Cc, CcBb, Bb, BbAa, Aa, etc. As should be appreciated, phases Aa and Cc will not be energized at the same time and phases Bb and Dd will not be energized at the same time. This fact permits a bit of savings in circuitry. Each of the phase windings Aa and Cc share an upper switching device to selectively connect one end of the windings to the positive battery terminal. Each of the motor windings Aa and Cc have their own switching device to selectively connect the other terminal of their associated winding to electrical ground. The windings Aa and Cc can share a current sense resistor since the two windings will not be energized at the same time. The switching arrangement for the windings Bb and Dd are similar in that they share an upper switching device and a current sense resistor. A similar control arrangement can be applied to a three phase system, though each phase would require to own DMCC and no sharing of FET's nor current sense resistors.

Specifically, FIG. 4 shows the connection for the drive circuitry and power switches for phases Aa and Cc. The other motor phases Bb, Dd have similar drive and switching circuits. A lower switching device 160 is operatively connected between one side of the stator coil Aa and electrical ground. A lower switching device 161 is operatively connected between one side of the stator coil Cc and electrical ground. An upper switching device 163 is operative coupled to the other side of the coil pair Aa and Cc through a current sense resistor 164. The other side of the switching device 161 is connected to the vehicle battery through an LC filter network 165. A first fly-back diode 166 is connected between the lower terminal of the coil Aa and the LC filter 162. A second fly-back diode 167 is connected between ground and the switching device 163. A third fly-back diode 168 is connected between the lower terminal of the coil Cc and the LC filter 165. An over-voltage protection Zener diode 169 is connected across switching device 163. An over-voltage protection Zener diode 170 is connected across switching device 160. An over-voltage protection Zener diode 171 is connected across switching device 161. Preferably, switching devices 160, 161, and 163 are solid state switches such as field-effect-transistors ("FET's"). The motor current sensor 97 is operatively coupled across the current sense resistor 164. Current control is accomplished by the digital motor current controller 100 controllably connected to each of the switches 160, 161, 163. Motor current is controlled by pulse-width-modulating ("PWM") the switches 160, 161, and 163.

Each of the upper FET 161 and bottom FETs 160, 161 are continuously PWM'ed. Current through the associated motor coil is controlled by the amount of the ON time overlap of their associated PWM control signals. When no current is to be supplied to a particular phase of the motor, its associated upper and lower FET's, although both being continuously pulse width modulated, have a 0% ON time overlap. Maximum phase current for any of the windings (coils) would occur when there is a 100% ON time overlap the PWM ON times of its associated upper and lower FETs. By controlling the amount of the ON time overlap, current through each of the motor phases is controlled.

Figure 3:
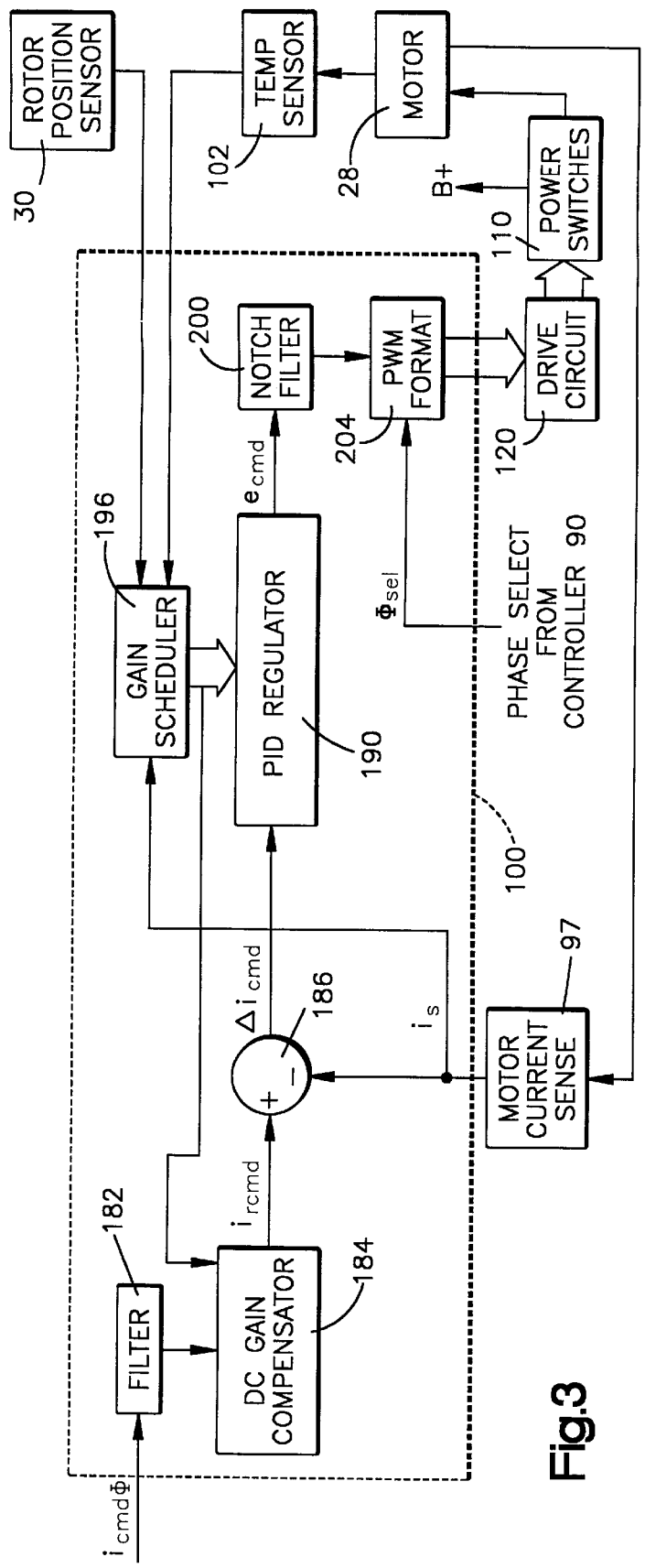
FIG. 3 is a schematic block diagram of a portion of the system of FIG. 1 showing the digital motor current controller in greater detail.

Referring to FIG. 3, the digital motor current controller ("DMCC") 100 is shown in greater detail. The DMCC controls current to all phases of the motor 28 by processing the current command signal $i_{cmd\phi}$ and the phase select signal $\phi_{SEL}$ from the controller 90. The purpose of the digital motor current controller 100 is to maintain a consistent bandwidth that is independent of the motor operating parameters of rotor position, motor current, and motor temperature. As mentioned, in the preferred four phase motor (phases Aa, Bb, Cc, and Dd), phases Aa and Cc will not be energized at the same time and phases Bb and Dd will not be energized at the same time. This permits not only the circuitry savings in the drive circuit 120 and power switches 110 discussed above, but also in the amount of circuitry and software in the DMCC. For the purposes of explanation, one control arrangement within the DMCC is described, it being understood that this would represent the control arrangement for two phases, e.g., Aa and Cc, and that the DMCC will include similar circuitry/functions for other motor phases Bb and Dd.

The current command $i_{cmd\phi}$ from the motor controller for a phase to be energized is connected to a first filter circuit 182. This filter 182 is preferably a pre-notch filter to remove any unwanted frequency content from the current command signal $i_{cmd\phi}$. Preferably, this filter is a second order filter realized in either series form or in parallel form. The filter 182 takes the following form:

$$i_{cmd(n)} = a \cdot i_{cmd(n-1)} + b \cdot i_{cmd(n-2)} + c \cdot i_{unfiltcmd(n)} d \cdot i_{unfiltcmd(n-1)} + e \cdot i_{unfiltcmd(n-2)}$$

In accordance with one embodiment, the filter is designed to notch out 2.4 kHz because the motors primary radial-axial mode (i.e., the motor's resonate frequency) is at 2.4 kHz. This also corresponds to the frequency at which the motor best emits acoustic noise. The notch filter removes energy in the command path that may excite the acoustic noise producing mode of the motor shell. This value is, of course, dependent upon the particular motor used.

The filtered current command signal is next processed in a DC gain compensator 184 that is designed to compensate for any steady state gain loss in the control loop due to relative magnitude differences. As will be appreciated from the discussion below, the DC gain compensator 184, under certain design criteria of the control loop, may be eliminated from the control loop of the DMCC. For example, if a proportional controller is used, the DC gain compensator is needed. If an integral controller is used, the DC gain compensator may be unnecessary.

The DC gain compensator 184 provides a reference current command value irked to a positive input of a feedback summing junction 186. The negative input of the summing junction 186 is connected to a motor current sense $i_s$ feedback line. The output of the summing junction 186 is a current difference value $\Delta i_{cmd}$ which is equal to the value of the difference between the reference current command value and the sensed motor current value, i.e., $$\Delta i_{cmd} = i_{rcmd} - i_s$$

This difference value $\Delta i_{cmd}$ is connected to a variable gain controller 190 (also referred to as a variable gain regulator). In accordance with one embodiment of the present invention, the variable gain controller is a proportional-integral-derivative ("PID") controller or regulator 190. PID controllers are known in the art. The PID controller 190, in accordance with the present invention, takes the following form:

Let $e(k) = \Delta i_{cmd}(k)$ $$e_{cmd}(k) = (K_p(k) \cdot e(k)) + \left(K_d\left(\frac{e(k) - e(k-1)}{\delta t}\right)\right) + \left(K_I\left(\sum e(k)\delta t\right)\right)$$

where $K_p$, $K_d$, and $K_I$ are proportional, derivative, and integral gain variables, respectively, k is the sample value, $\delta t$ is the sample rate, and $e_{cmd}$ is the error command output of the PID controller 130. These gain variables and, in turn, the gain of the controller PID are controlled in accordance with the present invention.

The rotor position sensor 30, the temperature sensor 102, and the feedback current sense $i_s$ from the motor current sense function 97 are connected to a gain scheduler 196. The gain scheduler 196 selects the values of the gain variables $K_p$, $K_d$, and $K_I$ in response to rotor position, motor temperature, and sensed motor current and outputs these values to the PID regulator 190. The proportional gain term $K_p$ is connected to the DC gain compensator 184 so that gain compensation "knows" the control loop gain.

The values for $K_p$, $K_d$, and $K_I$ are selected to not only provide a consistent current bandwidth but also to reduce acoustic noise induced by the current oscillation and to provide a fast motor current response time. The consistent bandwidth allows application of linear time invariant control theory since the nonlinear phase change from parameter variation is adaptively eliminated. In effect, the adaptive controller 190 reduces the effect of motor operating parameter variations from the resultant motor torque.

The error command output, $e_{cmd}$, of the PID controller 190 is connected to a notch filter 200. The purpose of the notch filer 200 is to eliminate acoustic noise due to stator shell vibration.

It has been discovered that energization of a pair of the VR motor's poles results in radial movement of the stator's shell. This is referred to as the motor's acoustically sensitive structural mode. At certain drive frequencies, the stator shell can resonate at a frequency well within the human audible range. This resonance makes the motor act as a "speaker". The motor can also act as a microphone in that the resonance affect can result in current fluctuations in the energized phase. The radial movement of the shell can be expressed in terms of shell displacement, velocity, and/or acceleration.

The notch filter 200 notches out the resonant frequencies of the acoustically sensitive structural modes of the motor from the voltage applied to the motor coil. The output of the notch filter 200 is connected to a PWM formatter 204. The phase select signal $\phi_{SEL}$ from the controller 90 is also connected to the PWM formatter 204. The output of the PWM formatter 204 is controllably connected to the upper and lower switching FETs to control the PWM ON times for each of the motor phases. In response to the filtered current demand signal from the notch filter 200 and the phase select signal, the PWM format controls the ON time overlap of the appropriate upper and lower switching FETs to energize the motor in the desired direction with the desired torque.

The motor controller 90 is operatively coupled to a diagnostic indicator 240 located within the passenger compartment of the vehicle. As is known in the art, the controller 90 (or another controller not shown) monitors system operation and actuates indicator 240 if a fault condition is sensed. When a fault condition is sensed, the motor 28 is prevented from being energized and the steering system reverts to an unassisted mode.

It is desirable, particularly in an electric assist steering system, to have a control arrangement that has reduced torque ripple. To properly control the VR motor torque, magnetic flux has to be induced by the current controller at each motor phase. During control of the motor, a changing flux linkage occurs that is a function of the varying motor operating conditions. A typical flux linkage for a VR motor is a function of the motor operating conditions such as the current and position. The changing nature of the flux linkage results in a time-varying dynamics of the VR motor during operation. The varying characteristic is most significant during the phase transition when the reluctance, the air volume between the stator and rotor, varies from the maximum value to the minimum value.

Torque ripple will occur if the phase transition is not controlled and compensated. To minimize the torque ripple, an optimized current profile that eliminates most of the torque ripple is generated. Even with such a current profile, the control arrangement must account for the time-varying dynamic motor characteristics. The time-varying phase current can be expressed as follows:

$$L\frac{di}{dt} = V_{cmd} - iR - \left(\frac{d\lambda(i,\theta,x)}{d\theta}\dot\theta - \frac{d\lambda(i,\theta,x)}{dx}\dot x\right) + \sigma_1$$

where $L(i,\theta,x)$ is phase inductance as a function of the current i, position $\theta$, and air gap x, R is motor resistance, $\lambda(i,\theta,x)$: flux linkage as a function of current i, position $\theta$, and air gap x, $\sigma_1$ is white noise, $V_{cmd}$ is the voltage command, $\dot\theta$ is the rotational rate of the motor, and $\dot x$ is the radial displacement rate of the motor shell.

The control of the phase current is limited by the battery voltage B+ as to how much voltage command $V_{cmd}$ can be applied. In addition, the last three terms of the above equation are treated as disturbance $d_1$, which would require disturbance rejection to maintain robustness. The current equation can be written as:

$$\frac{di}{dt} = \frac{1}{L(i,\theta,x)}[(-i \cdot R + V_{cmd})] + d_1$$

Figure 6:
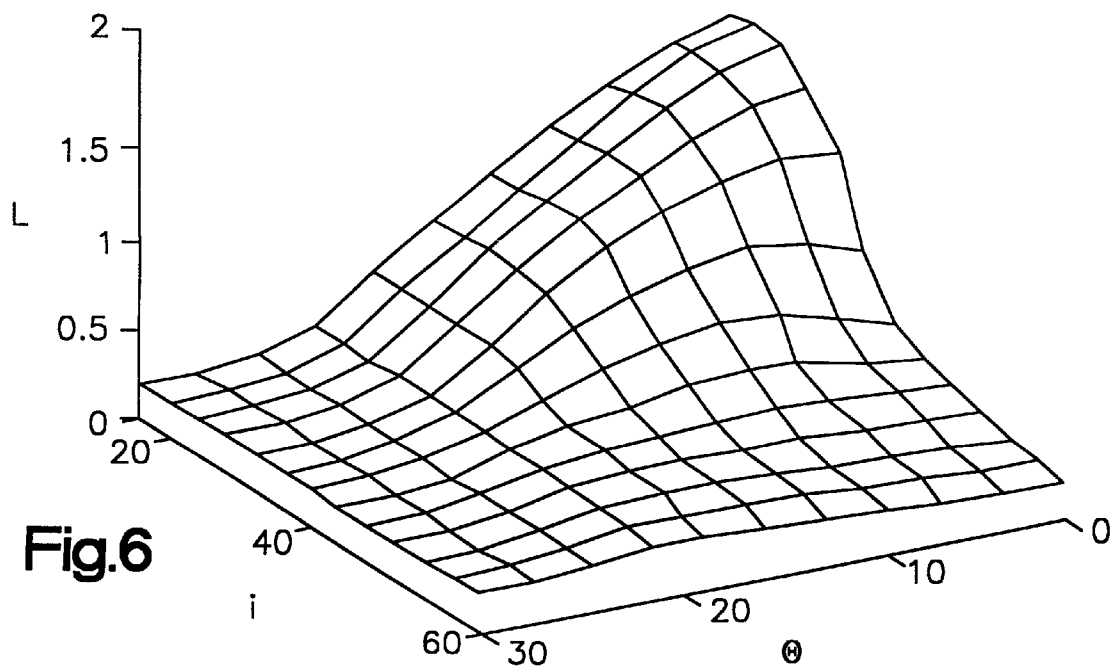
FIG. 6 is a three dimensional graphical representation of an inductance map of a VR motor.

Notice that the inductance is a function of current, position, and air gap. Assuming the air gap effect is negligible, the inductance of a VR motor can be expressed as a three dimensional map, as shown in FIG. 6. This map was empirically measured for a single phase of a four phase VR motor using an inductance analyzer. This varying inductance characteristic of the motor will affect the current control performance, and, in accordance with the present invention, is considered in the control arrangement. As the motor rotates, the inductance appears to be time-varying even though inductance is a deterministic function of current and angle.

For a digital current control system with an anti-aliasing filter with a pole at frequency "a" and a proportional gain $K_p$, the transfer function can be approximated in the Laplace domain as follows:

$$\frac{i_m}{i_{rcmd}} = \frac{K_p(s+a)}{L(i,\theta)\left[s^2 + \left(\frac{R+a}{L(i,\theta)}\right)s + \frac{a(R+K_p)}{L(i,\theta)}\right]}$$

The magnitude of the inductance will change the pole locations of this transfer function and affect the performance of the closed-loop current controller. With a fixed gain $K_p$, the pole locations would move from the real axis to the complex plane. With this changing pole location, the system can change from stable to oscillatory or even an unstable system if extra poles and zeros are introduced without acknowledging these varying motor characteristics during operation. If the fixed proportional gain value $K_p$ is lowered so that the current response does not exhibit oscillation, motor acoustic noise is reduced but torque ripple will occur due to poor current control. This will also compromise the controller's performance by decreasing the tracking capability for both a transient and steady state response in certain conditions.

The gain scheduler, in accordance with the present invention, can be tuned to any desirable bandwidth depending on the design criteria. To smooth out the time-varying effect of the dynamic system, the design objective is to maintain a consistent system characteristics of constant bandwidth and consistent phase lag.

Solving the characteristic equation, the dominant real pole of the system can be expressed as $$S_p = \frac{-\left(a+\frac{R}{L}\right)}{2} + \sqrt{\left(\frac{a+\frac{R}{L}}{2}\right)^2 - \frac{a(K_p+R)}{L}}$$

In general, the following assumption can be made $$R \ll aL$$

for example $$R < 0.1\Omega \ll aL(i,\theta) < 3.14 = 5000 \text{ Hz} \cdot 2\pi \cdot 100 \,\mu\text{H}$$

The equation can be simplified as $$S_p = \frac{-a}{2}\left[1 - \sqrt{1 - \frac{4(R+K_p)}{aL(i,\theta)}}\right]$$

To ensure a real pole, the following condition must be true $$K_p \leq \frac{aL(i,\theta)}{4} - R$$

And to maintain a constant bandwidth $\Omega_{ref}$, the proportional gain of the system has to be scheduled as a function of inductance, resistance, and anti-aliasing filter pole location and can be expressed as follows:

$$K_p = \frac{aL(i,\theta)}{4}\left[1 - \left(1 - \frac{2\omega_{ref}}{a}\right)^2\right] - R$$

Figure 7:
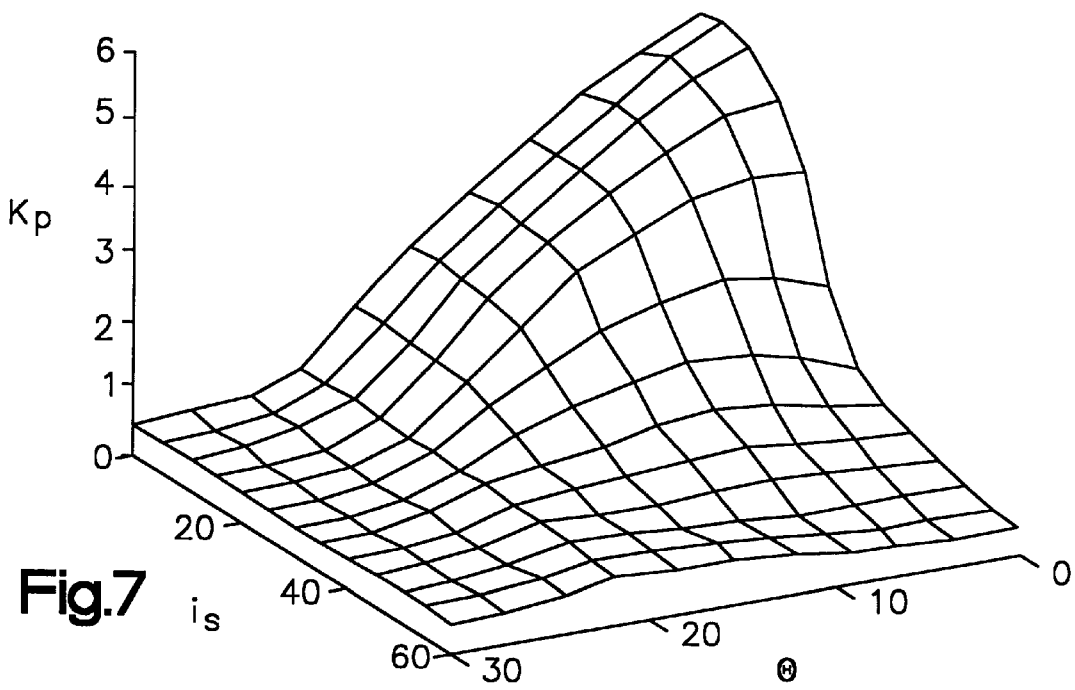
FIG. 7 is a three dimensional graphical representation of a proportional gain map as a function of sensed current and rotor angle.

The gain map as a function of the inductance using this equation can then be generated and is shown in FIG. 7.

Without the anti-aliasing filter, the gain scheduler can be further simplified to:

$$K_p = L(i,\theta) \cdot \omega_{ref} - R$$

The temperature will also affect the gain map by increasing the motor resistance with higher temperature. In this case, the temperature effect can be included as follows:

$$K_p = \frac{aL(i,\theta)}{4}\left[1 - \left(1 - \frac{2\omega_{ref}}{a}\right)^2\right] - R - \Delta R(T)$$

The last term is the resistance change due to the temperature effects. The motor temperature is sensed by the motor temperature sensor 102.

The steady state error can be significant when the scheduled gain $K_p$ is lowered. The steady state error can be expressed as:

$$\left.\frac{i}{i_{rcmd}}\right|_{steady\ state} = \frac{K_p}{R+K_p}$$

For example, nominal gain for a typical control system is about 2 and the resistance is approximately 0.1 Ohms, which would introduce a 5% steady state error. However, as the gain scheduler is adaptively calculating $K_p$ to compensate the inductance variation, the gain $K_p$ can be small enough to induce a large steady state error. This is corrected by the DC gain compensator 184. The DC gain compensator can be expressed as the following:

$$K_{DC\_compensator} = 1 + \frac{R}{K_p}$$

The shell vibration can be reduced using the consistent gain current controller. Maintaining the current control bandwidth at a lower level will reduce the shell acceleration using a constant gain controller. The gain scheduler was used in one embodiment of the present invention to maintain the current control bandwidth at approximately 330 Hz.

The notch filter reduces noise gain from the feedback path of the current control loop. The noise transfer function of $d_2$ can be expressed as $$\frac{1}{d_2} = \frac{1}{L(i,\theta)\left[s^2 + \left(\frac{R+a}{L(i,\theta)}\right)s + \frac{a(R+K_p)}{L(i,\theta)}\right]}.$$

The denominator is the same as the current response characteristic equation. The motor acoustic noise is directly related to the current control loop through motor housing or shell acceleration. Reducing the noise response at the structural mode is equivalent of restricting the gain of the current control loop at that frequency. Without the gain scheduler of the present invention, the bandwidth can approach the motor's structural mode which will provide high noise gain and induce more acoustic noise. The gain scheduler will reduce the excitation at that frequency by maintaining a consistent bandwidth which is lower than the highest varying bandwidth without the invention.

The value of $K_p$ is functionally related to the motor current, motor position, system resistance and motor temperature. Values for $K_p$ are preferably predetermined and stored in a look-up table.

Figure 5:
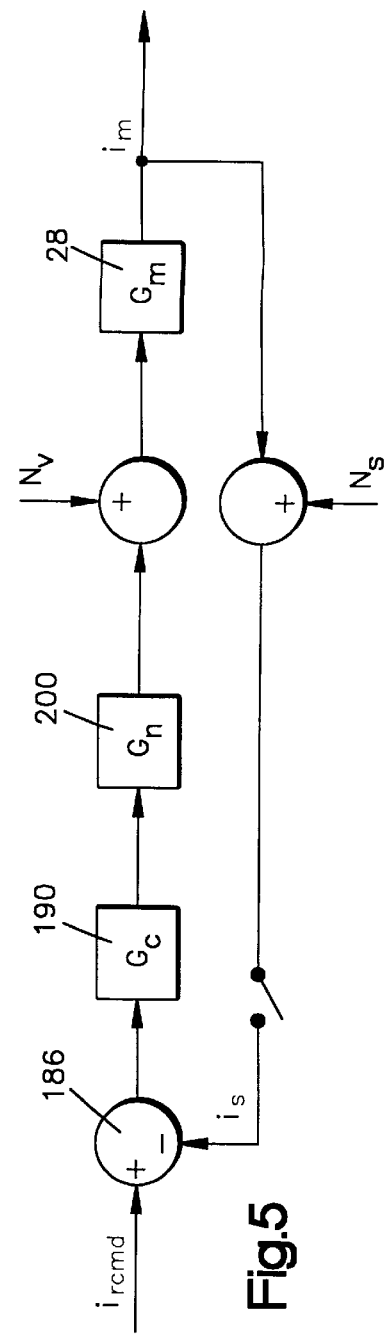
FIG. 5 is block diagram showing a portion of the closed loop control function of the present invention.

Referring to FIG. 5, the closed loop feed-back control arrangement for the digital motor current controller is shown. The output of the DC gain compensator 184, which is the reference current command signal $i_{rcmd}$, is connected to the summing circuit 186 as described above. The other input to the summing circuit is the motor current feed-back signal $i_s$. The variable gain PID controller is represented by the transfer function designation $G_c$. The transfer function for the notch filter 200 is represented by the transfer function designation $G_n$. Voltage noise $N_v$ is present in the system and is shown as being summed into the control loop. The notch filter $G_n$ plus the voltage noise $N_v$ is connected to the motor coil having transfer function designation $G_m$. The motor current $i_m$ is summed with current noise $N_s$ present in the system which results in a sensed feedback current $i_s$. The sensed feedback current $i_s$ is summed with the reference command current $i_{rcmd}$ through a closed loop switch. This switch is shown to designate a break point when considering the normally closed loop system as an open loop control system.

Figure 8:
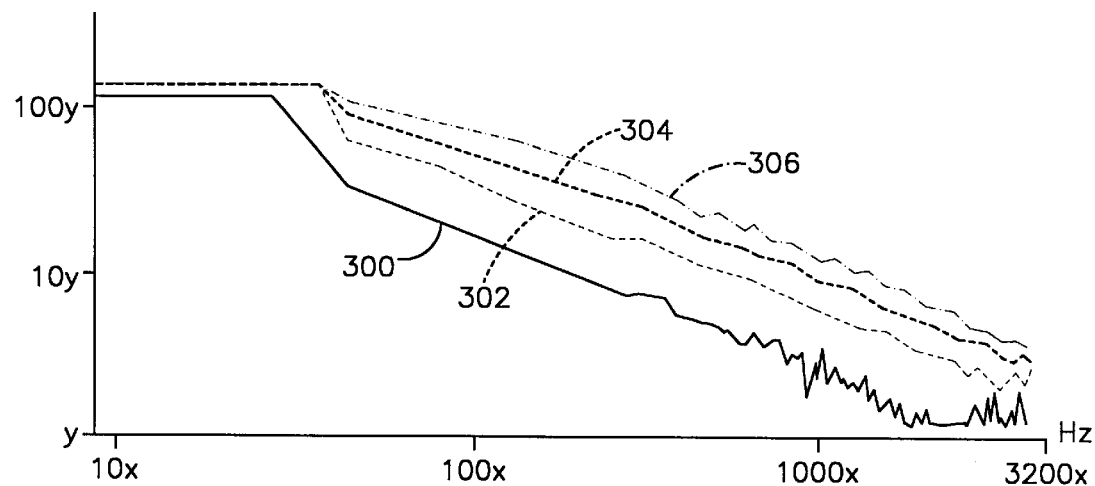
FIG. 8 is a Bode plot of an open loop transfer function of a steering system at different current values with a motor offset at 0°.

Referring to FIG. 8, a Bode plot is shown for an open loop transfer function of phase D motor current $i_m$ to motor command $i_{cmd}$ (the switch in the feedback line is open) with the rotor offset by 0° at different currents. The angle 0° is the angle at which the rotor is aligned when phase-D of the motor is energized. This is generally termed the aligned rotor position and is a stable equilibrium point for the motor, i.e., when the coil is energized, the rotor will stay at 0°. The angle 30° is the a rotation of 30 mechanical degrees from the 0° point. This location is an unstable equilibrium point for phase-D excitation because the rotor pole is exactly between two stator poles, and in order to maximize inductance, the rotor must rotate either to 0° or 60°. This graph is for a steering system without the digital motor controller of the present invention. As the current increases, the high frequency gain increases. The line 300 is a current value less than the current represented by line 302 which is, in turn, less than the current value represented by line 304, which is, in turn, less than the current value represented by the line 306.

The high frequency gain increases with current because the inductance of the motor decreases with current at the aligned rotor position. The pole of the motor is at the frequency R/L and the higher the pole, the higher the gain at high frequency.

Figure 9:
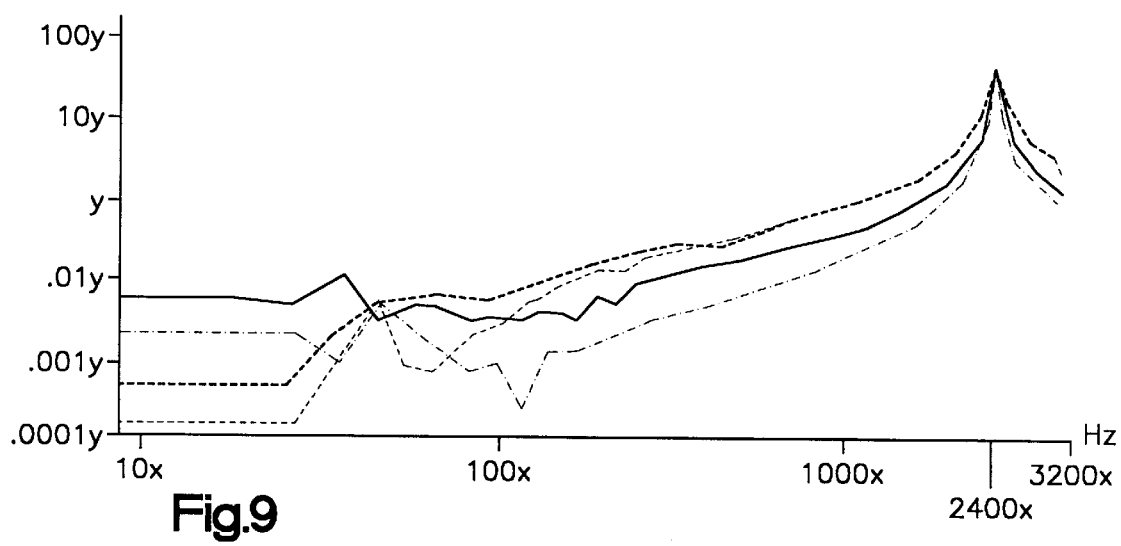
FIG. 9 is an illustration of a frequency response of motor shell acceleration to motor current command for the open loop system of FIG. 8.

A plot of the motor shell acceleration is shown in FIG. 9 with the lines representing the same current values shown in FIG. 8, again, without the digital motor current controller of the present invention. This graph shows a resonant frequency for the motor shell at 2.4 kHz.

Figure 10:
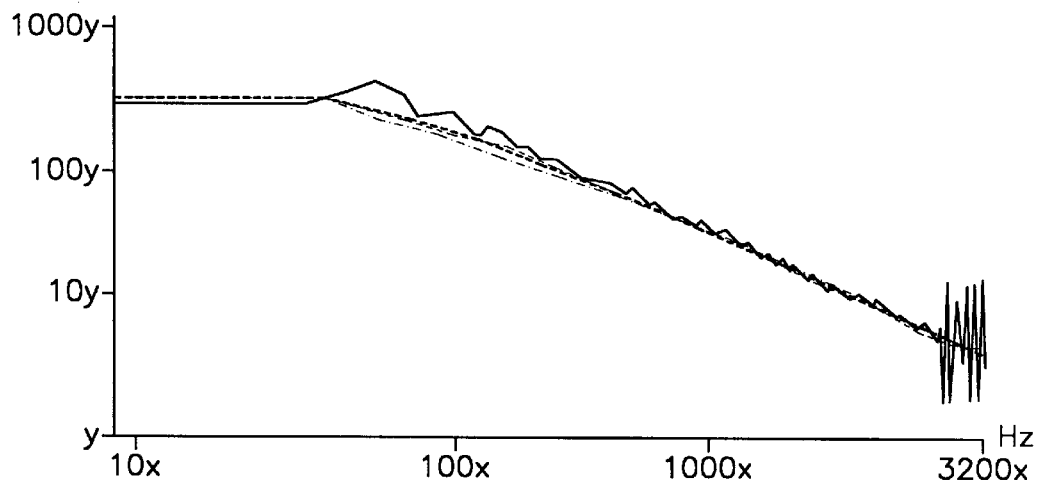
FIG. 10 is a Bode plot of an open loop transfer function of a steering system at different current values with a motor offset at 30°.

FIG. 10 is a Bode plot with the lines representing the same current values shown in FIG. 8, again, without the digital motor current controller of the present invention. This graph is different in that it represents a rotor offset by 30° which is the maximum offset that would occur in a four phase motor with a rotor having six rotor poles. In this plot, one can see that the high frequency gains are the same when the motor inductance is at a minimum. The high frequency gain is substantially constant with increasing current because the inductance of the motor is substantially constant with respect to current at the unaligned rotor position.

Figure 11:
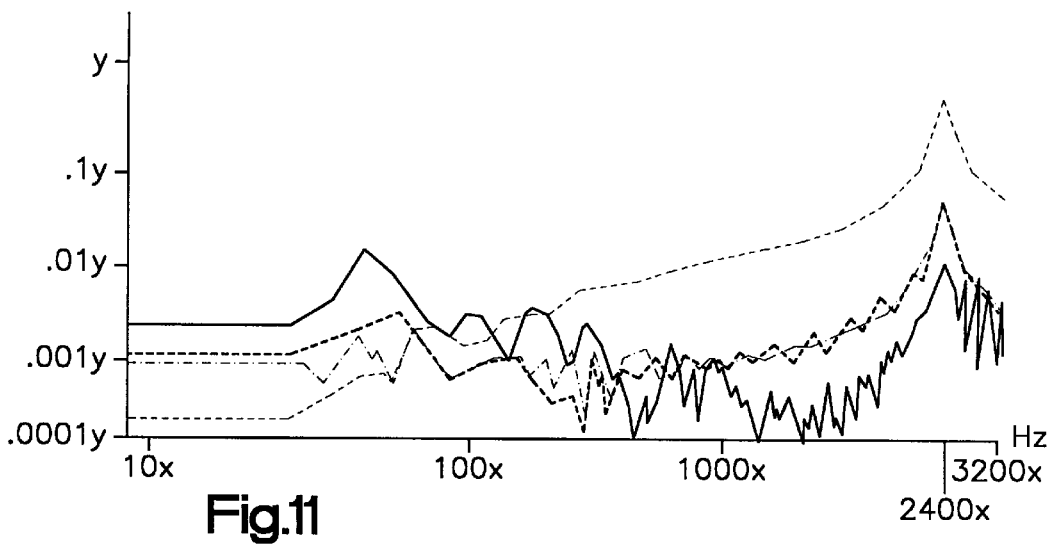
FIG. 11 is an illustration of a frequency response of motor shell acceleration to motor current command for the open loop system of FIG. 10.

FIG. 11 is a frequency response showing the shell acceleration when the motor rotor is at the 30° offset condition, again, without the digital motor current controller of the present invention. One can see that the motor resonance again occurs at 2.4 kHz.

Figure 12:
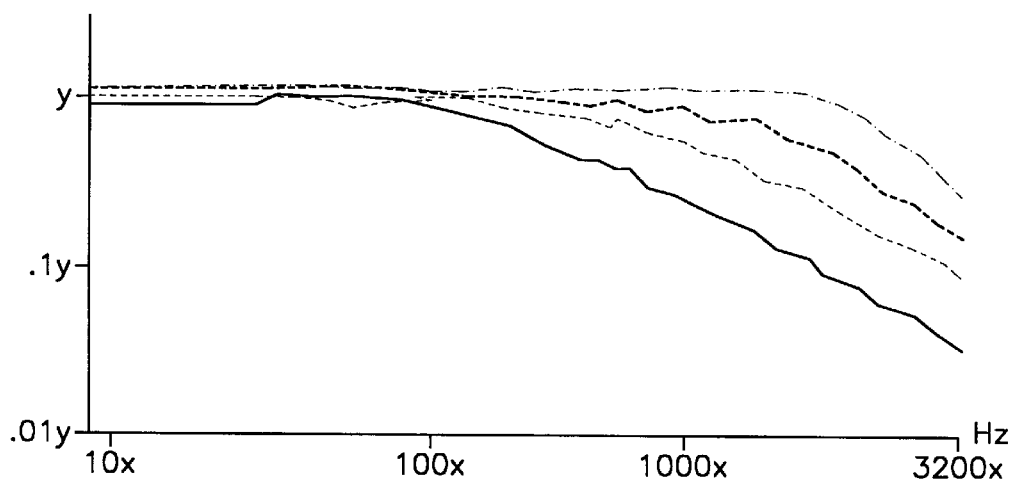
FIG. 12 is a Bode plot of a closed loop transfer function of a steering system not having the gain scheduler of the present invention at different current values with a motor offset at 0°.

FIG. 12 is a Bode plot of a closed loop control with constant gain controller when the motor rotor is offset at 0°.

Figure 13:
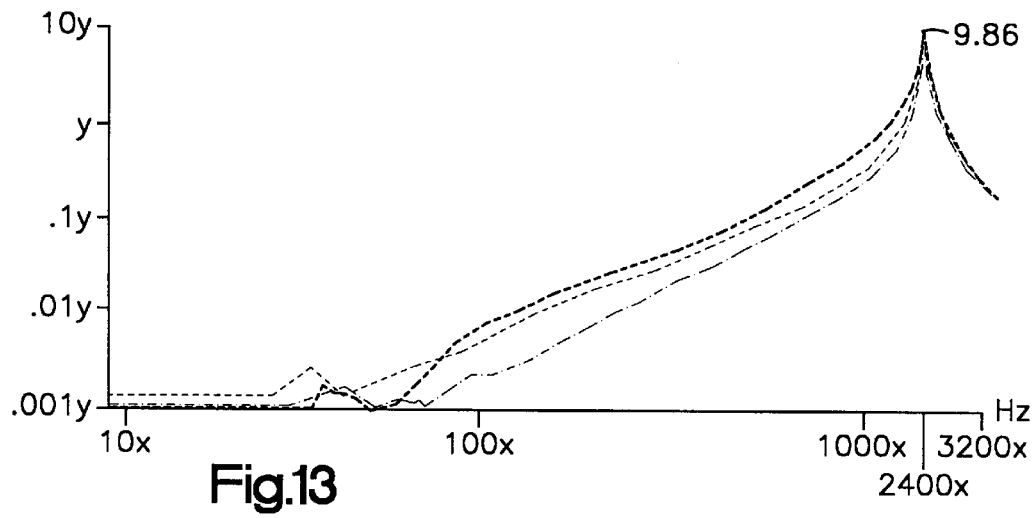
FIG. 13 is an illustration of a frequency response of motor shell acceleration to motor current command for the closed loop system of FIG. 12.

FIG. 13 is a frequency response plot showing the shell acceleration with the use of a constant gain controller. This graph shows the shell acceleration at the motor resonant frequency of 2.4 kHz.

Figure 14:
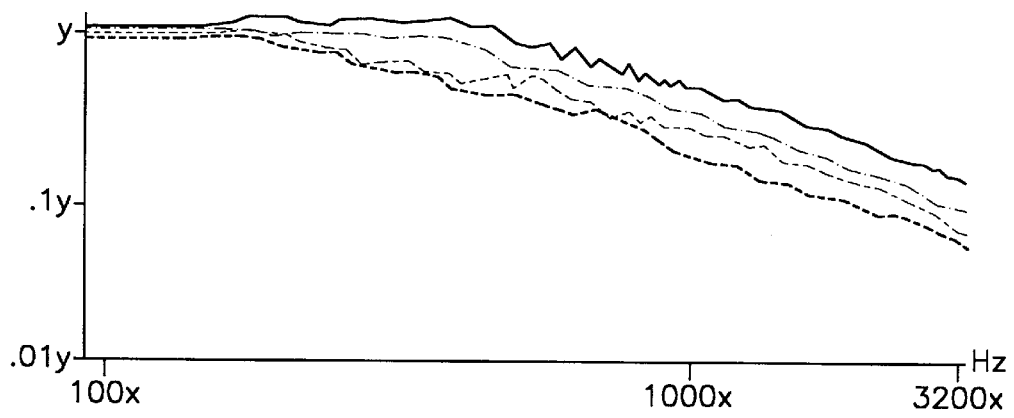
FIG. 14 is a Bode plot of a closed loop transfer function of a steering system having the gain scheduler of the present invention at different current values with a motor offset at 0°.

FIG. 14 is a Bode plot showing the closed loop control arrangement with the gain scheduler, in accordance with the present invention, with a rotor offset at 0° offset. This plot shows a significant improvement in the system frequency response and the 3 dB roll-off points, i.e., the bandwidth of the motor current control is more constant than for the constant gain system of FIG. 12.

Figure 15:
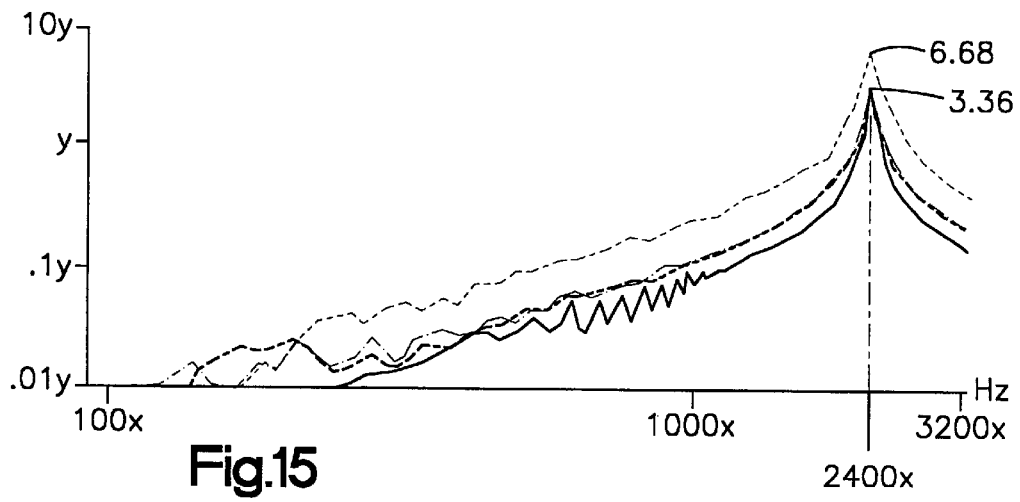
FIG. 15 is an illustration of a frequency response motor shell acceleration to motor current command for of the closed loop system of FIG. 14.

FIG. 15 is a frequency response plot showing the shell acceleration when the gain scheduler, in accordance with the present invention, is used at a rotor offset of 0°. One can see a substantial decrease in the shell acceleration which, in turn, equates into reduced audible noise and reduced torque ripple.

Note that the effect of the gain scheduler (FIG. 13) is to obtain a more constant bandwidth of the current transfer function when compared to the constant gain system (FIG. 12). The gain is more constant in FIG. 13 because the changing inductance of the coil as motor current increases is compensated by decreasing the proportional is gain of the system. The effect of the gain scheduler is also to reduce the acceleration of the motor shell when compared with a constant gain system (FIGS. 13 and 15).

The notch filter 200 functions to shape the frequency response of the motor current controller within its control bandwidth. For example, shaping the frequency response of the motor current controller avoids the acoustic noise by notching out the resonant frequencies of the acoustically sensitive structural modes, i.e., those frequencies at which the stator shell will resonate. By controlling the acoustic noise, the motor current control bandwidth can be increased. By increasing this control bandwidth, torque ripple is reduced. The notch filter avoids the structural resonance that produces acoustic noise.

$G_c$ is the transfer function for the controller 190. Assuming that the controller 190 is a proportional/integral controller, its transfer function is:

$$G_c = K_p(1 + K_1/s)$$

The transfer function $G_n$ for the notch filter 200 is:

$$G_n = \frac{s^2 + 2\varsigma_1 \omega_{n1} s + \omega_{n1}^2}{s^2 + 2\varsigma_2 \omega_{n2} s + \omega_{n2}^2}$$

where $\omega_{n1}$, $\omega_{n2}$ are the frequencies close to the notch and the ratio of the damping factors ç1 and ç2 define the depth of the notch. In the present embodiment, $\omega_{n1}\omega_{n2} = 2100 \cdot 2\pi$, ç1=0.1 and ç2=0.6 providing about 15 dB of rejection. (In this embodiment, motor resonance is at 2.1 KHz) The motor transfer function $G_m$ is:

$$G_m = \frac{1}{Ls + R}$$

where L is the local inductance of the motor and R is the resistance.

Considering the control loop transfer functions, one gets:

$$((i_{rcmd} - (i_m + N_s)) G_c G_n + N_v) G_m = i_m$$

The command response is then:

$$\frac{i_m}{i_{rcmd}} = \frac{G_c G_n G_m}{1 + G_c G_n G_m}$$

The sensor noise response is:

$$\frac{i_m}{N_s} = \frac{-G_c G_n G_m}{1 + G_c G_m G_n}$$

The voltage noise response is:

$$\frac{i_m}{N_v} = \frac{G_m}{1 + G_c G_m G_n}$$

Figure 16:
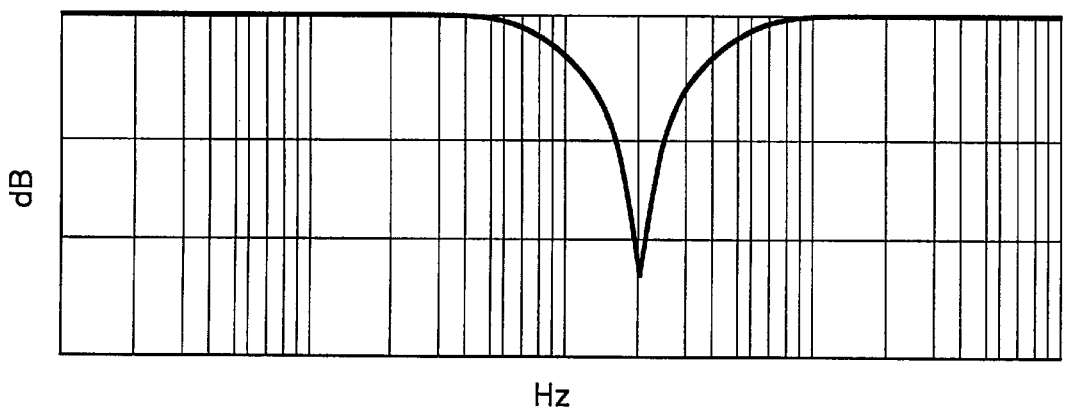
FIG. 16 is a gain plot of a Bode plot of a typical notch filter.
Figure 17:
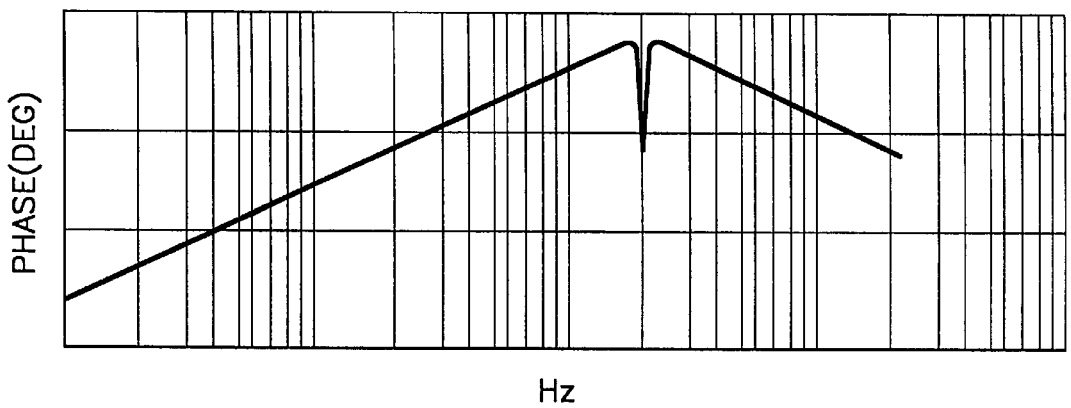
FIG. 17 is a phase plot of the Bode plot for the notch filter of FIG. 16.
Figure 18:
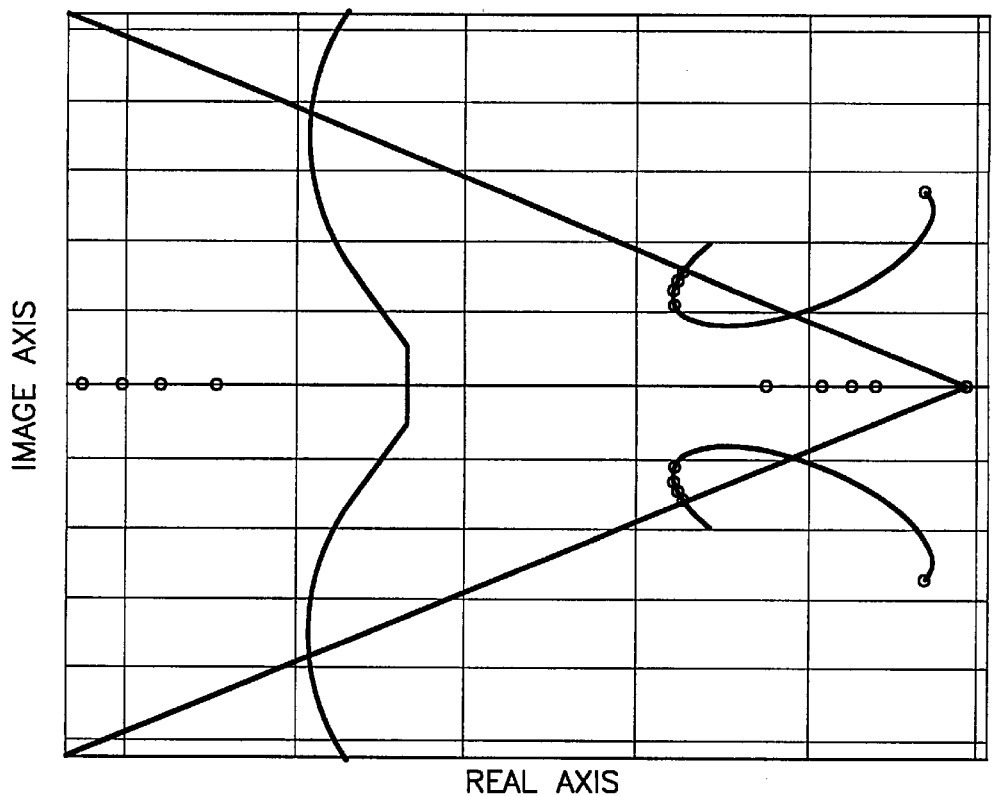
FIG. 18 is a root locus plot of a notch filter in a complete current control system.
Figure 19:
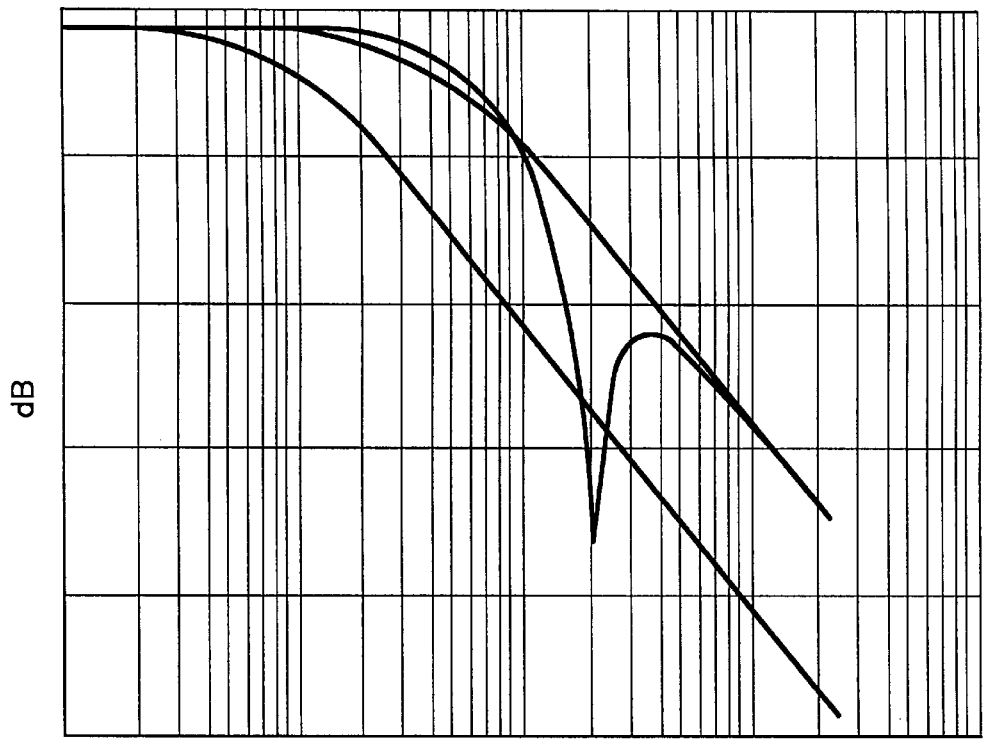
FIG. 19 is a graphical illustration of a gain comparison of the notch consistent bandwidth controller of the present invention.
Figure 20:
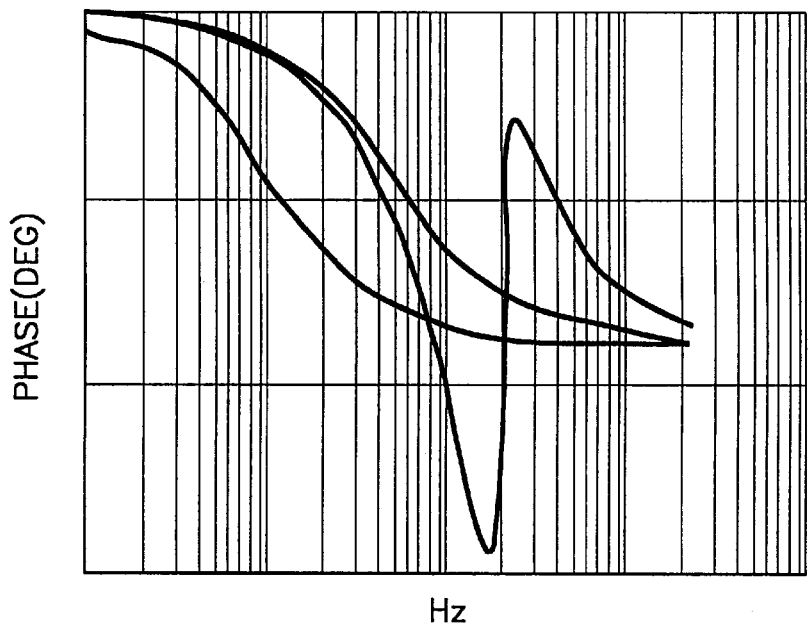
FIG. 20 is a graphical illustration of a phase comparison of the notch consistent bandwidth controller of the present invention.

Given a consistent current bandwidth motor, the notch $G_n$ can be used to design a motor current controller that attenuates the noise at the frequency where the structural noise occurs. As shown in FIGS. 16 and 17, a notch $G_n$ was designed to provide 20 dB attenuation of the motor shell acceleration. From the root locus analysis, as shown in FIG. 18, a closed loop current controller can be designed to achieve a notched consistent bandwidth that does not excite the motor structural noise. Compared to the lowest bandwidth of a constant gain controller, as shown in FIGS. 19 and 20, the notched consistent bandwidth controller has lower noise magnifying gain while maintaining a higher bandwidth. The lower fall off trace is 100 Hz and the upper fall off trace is 600 Hz.

Figure 21:
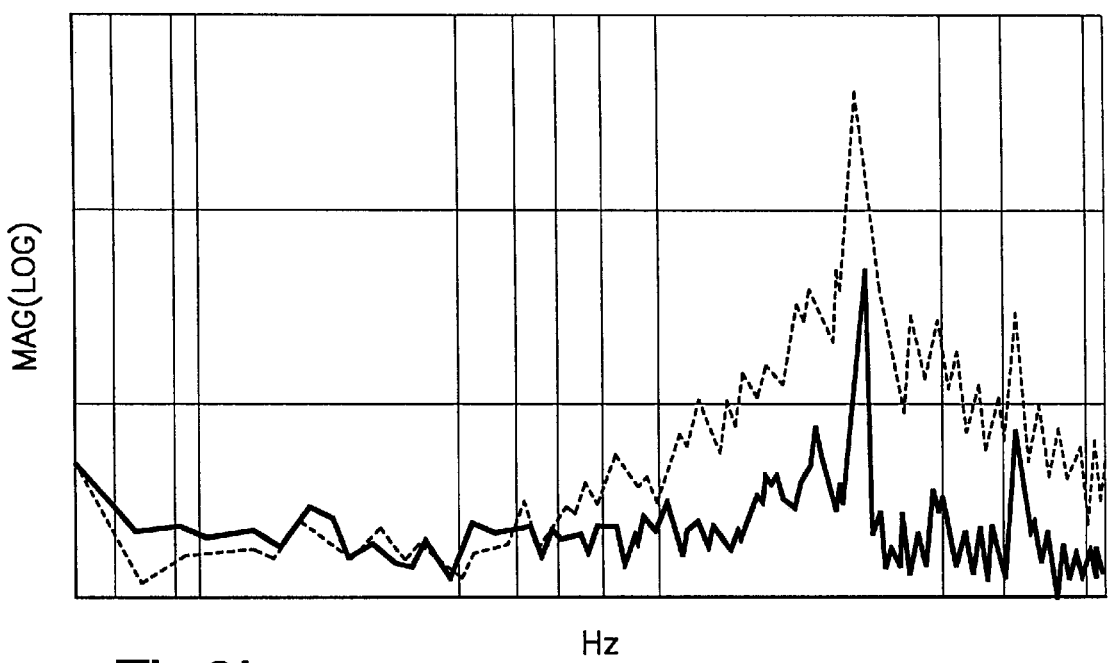
FIG. 21 is a graphical illustration of motor shell acceleration with and without the notch consistent bandwidth controller of the present invention.

The result of the above controller was tested at 20 rpm and the shell vibration was measured and compared to a constant gain controller. As shown in FIG. 21, the power spectral density of the proposed notched consistent bandwidth is only 1.4% of the constant gain controller. The upper plot in FIG. 21 is without the notch filter and the bottom plot is with the notch consistent bandwidth controller.

Attached hereto as microfiche appendix is a copy of a software program listing for implementation of the digital motor current controller. The gain scheduler and notch filter could be implemented either digitally using a microcomputer to accomplish the functions depicted in the Figures, using discrete circuitry, or using a combination of digital and discrete implementation preferably housed in an ASIC.

From the above description of preferred embodiments of the invention, those skilled in the art will perceive improvements, changes and modifications. For example, dynamic operating characteristics such as position, current, and temperature were used in the motor control. Those skilled in the art will appreciate that motor flux can be used in the motor control as a dynamic operating characteristic. Such improvements, changes and modifications within the skill of the art are intended to be covered by the appended claims.

Having fully described the invention, the following is claimed:

1. A motor controller for controlling the operation of an electric motor, said motor controller comprising:

sensing means for sensing at least one dynamic operating characteristic of said motor and for providing a signal indicative of the at least one sensed dynamic motor operating characteristic;

variable gain regulator for receiving a current command request signal having a value and for providing a motor current control signal having a value functionally related to the value of said received current command request signal and a gain control value;

gain scheduler operatively coupled to said variable gain regulator and to said sensing means for providing said gain control value to said variable gain regulator in response to said sensed at least one dynamic motor operating characteristic to thereby control the amount of gain of said variable gain regulator; and drive circuit operatively connected to the variable gain regulator and said motor for energizing said motor in response to said motor current control signal.

2. The motor controller of claim 1 wherein said motor is a variable reluctance motor having a stator and a rotor and wherein said dynamic operating characteristic is position and wherein said sensor means includes a rotor position sensor that provides a signal having a value indicative of the position of the motor's rotor relative to its stator.

3. The motor controller of claim 1 wherein said motor is a variable reluctance motor and wherein said dynamic operating characteristic is current and wherein said sensor means includes a motor current sensor that provides a signal having a value indicative of the motor's current.

4. The motor controller of claim 1 wherein said motor is a variable reluctance motor and wherein said dynamic operating characteristic is temperature and wherein said sensor means includes a temperature sensor that provides a signal having a value indicative of the temperature of the motor.

5. The motor controller of claim 1 wherein said motor is a variable reluctance motor and wherein said dynamic operating characteristic is flux and wherein said sensor means includes a flux sensor that provides a signal having a value indicative of the flux of the motor.

6. The motor controller of claim 1 wherein said motor is a variable reluctance motor having a stator and a rotor and wherein said sensor means includes a rotor position sensor that provides a signal having a value indicative of the position of the motor's rotor relative to its stator, a current sensor that provides a signal having a value indicative of the motor's current, and a temperature sensor that provides a signal having a value indicative of the temperature of the motor.

7. The motor controller of claim 1 wherein said gain regulator is a controller for processing said current command signal in accordance with at least one of proportional function, an integral function, and a derivative function.

8. The motor controller of claim 1 wherein said gain regulator is a controller for processing said current command signal in accordance with a proportional function, and an integral function.

9. The motor controller of claim 1 further including a DC gain compensation circuit for adjusting the value of said current command signal to correct for any steady state error values that may be present in the system.

10. The motor controller of claim 1 further including at least one notch filter for blocking a predetermined band of frequencies from passing to said drive circuit.

11. The motor controller of claim 10 wherein said at least one notch filter includes circuitry for blocking said band of frequencies having a value functionally related to a resonant frequency of said motor.

12. An electric assist steering system comprising:

a torque sensor for sensing applied steering torque and providing a signal having a value indicative of the applied steering torque;

an electric assist motor drivingly connected to a steering member so that when said electric assist motor is energized, it provides steering assist;

a motor controller for providing a current command signal having a value functionally related to the sensed applied steering torque;

sensor means for sensing at least one dynamic operating characteristic of said motor and for providing a signal indicative of the at least one sensed dynamic motor operating characteristic;

variable gain regulator for receiving said current command signal having a value and for providing a motor current control signal having a value functionally related to the value of said received current command signal and a gain control value;

gain scheduler operatively coupled to said variable gain regulator and to said sensing means for providing said gain control value to said variable gain regulator in response to said sensed at least one dynamic motor operating characteristic to thereby control the amount of gain of said variable gain regulator; and drive circuit operatively connected to the variable gain regulator and said motor for energizing said motor in response to said motor current control signal.

13. The electric assist steering system of claim 12 wherein said electric assist motor is a variable reluctance motor having a stator and a rotor and wherein said at least one dynamic operating characteristic is position and wherein said sensor means includes a rotor position sensor that provides a signal having a value indicative of the position of the motor's rotor relative to its stator.

14. The electric assist steering system of claim 12 wherein said electric assist motor is a variable reluctance motor and wherein said at least one dynamic operating characteristic is current and wherein said sensor means includes a motor current sensor that provides a signal having a value indicative of the motor's current.

15. The electric assist steering system of claim 12 wherein said electric assist motor is a variable reluctance motor and wherein said at least one dynamic operating characteristic is temperature and wherein said sensor means includes a temperature sensor that provides a signal having a value indicative of the temperature of the motor.

16. The electric assist steering system of claim 12 wherein said electric assist motor is a variable reluctance motor and wherein said at least one dynamic operating characteristic is flux and wherein said sensor means includes a flux sensor that provides a signal having a value indicative of the flux of the motor.

17. The electric assist steering system of claim 12 wherein said electric assist motor is a variable reluctance motor having a stator and a rotor and wherein said sensor means includes a rotor position sensor that provides a signal having a value indicative of the position of the motor's rotor relative to its stator, a current sensor that provides a signal having a value indicative of the motor's current, and a temperature sensor that provides a signal having a value indicative of the temperature of the motor.

18. The electric assist system of claim 12 wherein said gain regulator is a controller for processing said current command signal in accordance with at least one of proportional function, an integral function, and a derivative function.

19. The electric assist steering system of claim 12 wherein said gain regulator is a controller for processing said current command signal in accordance with a proportional function and an integral function.

20. The electric assist steering system of claim 12 further including a DC gain compensation circuit for adjusting the value of said current command signal to correct for any steady state error values that may be present in the system.

21. The electric assist steering system of claim 12 further including at least one notch filter for blocking a predetermined band of frequencies from passing to said drive circuit.

22. The electric assist steering system of claim 21 wherein said at least one notch filter includes circuitry for blocking said band of frequencies having a value functionally related to a resonant frequency of said electric assist motor.

23. A method for controlling the operation of an electric motor, said method comprising the steps of:

sensing at least one dynamic operating characteristic of the motor and providing a signal indicative of the at least one sensed dynamic motor operating characteristic;

providing a variable gain regulator for receiving a current command request signal having a value and for providing a motor current control signal having a value functionally related to the value of said received current command request signal and a gain control value;

providing the gain control value to the variable gain regulator in response to the sensed at least one dynamic motor operating characteristic to thereby control the amount of gain of the variable gain regulator; and energizing said motor in response to the motor current control signal.

24. The method of claim 23 wherein said motor is a variable reluctance motor having a stator and a rotor and wherein said at least one dynamic operating characteristic is position and wherein said step of sensing includes the step of sensing rotor position and providing a signal having a value indicative of the position of the motor's rotor relative to its stator.

25. The method of claim 23 wherein said motor is a variable reluctance motor and wherein said at least one dynamic operating characteristic is current and wherein said step of sensing includes the step of sensing motor current and providing a signal having a value indicative of the motor's current.

26. The method of claim 23 wherein said motor is a variable reluctance motor and wherein said at least one dynamic operating characteristic is temperature and wherein said step of sensing includes the step of sensing motor temperature and providing a signal having a value indicative of the temperature of the motor.

27. The method of claim 23 wherein said motor is a variable reluctance motor and wherein said at least one dynamic operating characteristic is flux and wherein said step of sensing includes the step of sensing motor flux and providing a signal having a value indicative of the flux of the motor.

28. The method of claim 23 wherein said motor is a variable reluctance motor having a stator and a rotor and wherein said step of sensing includes the step of sensing rotor position and providing a signal having a value indicative of the position of the motor's rotor relative to its stator, sensing motor current and providing a signal having a value indicative of the motor's current, and sensing motor temperature and providing a signal having a value indicative of the temperature of the motor.

29. The method of claim 23 wherein said gain regulator processes said current command signal in accordance with at least one of proportional function, an integral function, and a derivative function.

30. The method of claim 23 wherein said gain regulator processes said current command signal in accordance with a proportional function and an integral function.

31. The method of claim 23 further including the step of adjusting the value of said current command signal to correct for any steady state error values that may be present in the system.

32. The method of claim 23 further including the step of filtering said current command signal to block a predetermined band of frequencies from driving the motor.

33. The method of claim 32 wherein said step of filtering includes blocking said band of frequencies having a value functionally related to a resonant frequency of the motor.

* * * * *